(12) United States Patent
Barnette et al.

(10) Patent No.: US 11,321,497 B2
(45) Date of Patent: May 3, 2022

(54) SYSTEMS AND METHODS FOR COOLING COMPUTING DEVICE EXPANSION MODULES BASED ON AIRFLOW RATES

(71) Applicant: Lenovo Enterprise Solutions (Singapore) Pte. Ltd., New Tech Park (SG)

(72) Inventors: Jamaica LaQuay Barnette, Research Triangle Park, NC (US); Douglas Evans, Research Triangle Park, NC (US); Dipak Tailor, Research Triangle Park, NC (US); Brian Christopher Totten, Research Triangle Park, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 300 days.

(21) Appl. No.: 16/456,650

(22) Filed: Jun. 28, 2019

(65) Prior Publication Data
US 2020/0410059 A1 Dec. 31, 2020

(51) Int. Cl.
*G06F 30/00* (2020.01)
(52) U.S. Cl.
CPC .................................. *G06F 30/00* (2020.01)
(58) Field of Classification Search
CPC .... G06F 30/20; G06F 30/347; G06F 2111/20; G06F 2113/02; G06F 30/28; G06F 30/00; G06F 1/20; G06F 30/39; G06F 30/17; G06F 1/206
USPC .................................................... 703/1; 73/1
See application file for complete search history.

(56) References Cited

U.S. PATENT DOCUMENTS

| | | | |
|---|---|---|---|
| 2007/0089446 A1* | 4/2007 | Larson | H01L 23/34 62/259.2 |
| 2015/0253829 A1* | 9/2015 | Palmer | G06F 1/28 713/300 |

OTHER PUBLICATIONS

Khalili, Sadegh et al., "Impact of Fans Location on the Cooling Efficiency of IT Servers", May 28, 2019, 18th IEEE Itherm Conference, IEEE. (Year: 2019).*
Zhang, H.Y. et al., "Air Flow Modeling and Analysis for Thermal Management in Functional Burn-In Systems", 2007, 9th Electronics Packaging Technology Conference, IEEE. (Year: 2007).*
Cho, Jinkyun et al., "Evaluation of Air Distribution System's Airflow Performance for Cooling Energy Savings in High-Density Data Centers", Sep. 9, 2013, Energy and Buildings 68, Elsevier B.V. (Year: 2013).*

\* cited by examiner

*Primary Examiner* — Cedric Johnson
(74) *Attorney, Agent, or Firm* — Olive Law Group, PLLC

(57) ABSTRACT

Systems and methods for cooling computing device expansion modules based on airflow rates are disclosed. According to an aspect, a method includes determining airflow rates in areas available for operable connection of expansion modules within a computing device during operation of the computing device. The method also includes determining expected power consumption of the expansion modules. Further, the method includes presenting placement of the expansion modules in the areas based on the determined airflow rates and the expected power consumption of the expansion modules.

16 Claims, 4 Drawing Sheets

SYSTEMS AND METHODS FOR COOLING COMPUTING DEVICE EXPANSION MODULES BASED ON AIRFLOW RATES

TECHNICAL FIELD

The presently disclosed subject matter relates generally to electronic device cooling within computing devices. Particularly, the presently disclosed subject matter relates to systems and methods for cooling computing device expansion modules based on airflow rates.

BACKGROUND

There is an increasing demand for processing and storage made available by servers residing in data centers. In a data center, servers are typically stacked together in a rack or a case to consolidate network resources and minimize floor space. Servers include heat generating electronic components or devices (such as integrated circuit devices) housed in a modular chassis or case, which in turn is mounted together with other similar modules, in a rack, blade cabinet, blade server, or other support structure. Also, expansion modules, such as peripheral component interconnect (PCI)-compatible cards, may be suitably connected to and remove from interface with a server.

During operation, expansion modules and other electronic devices in servers generate heat, and it is desired to efficiently remove the heat for effective functioning of the server. Accordingly, there is a continuing need for improved systems and techniques to efficiently cool electronic devices within servers and other computing devices.

BRIEF DESCRIPTION OF THE DRAWINGS

Figure 1:
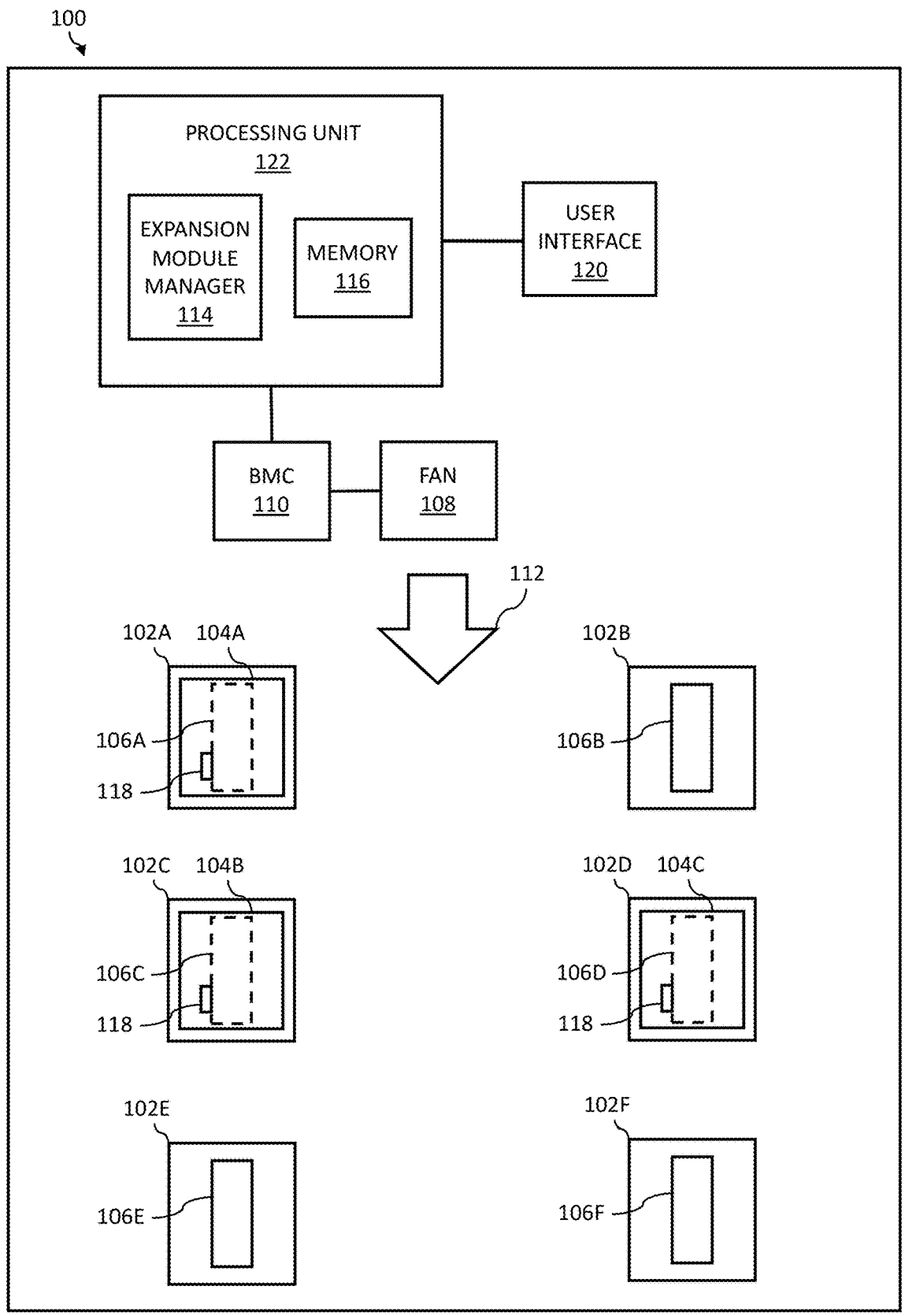
Figure 2:
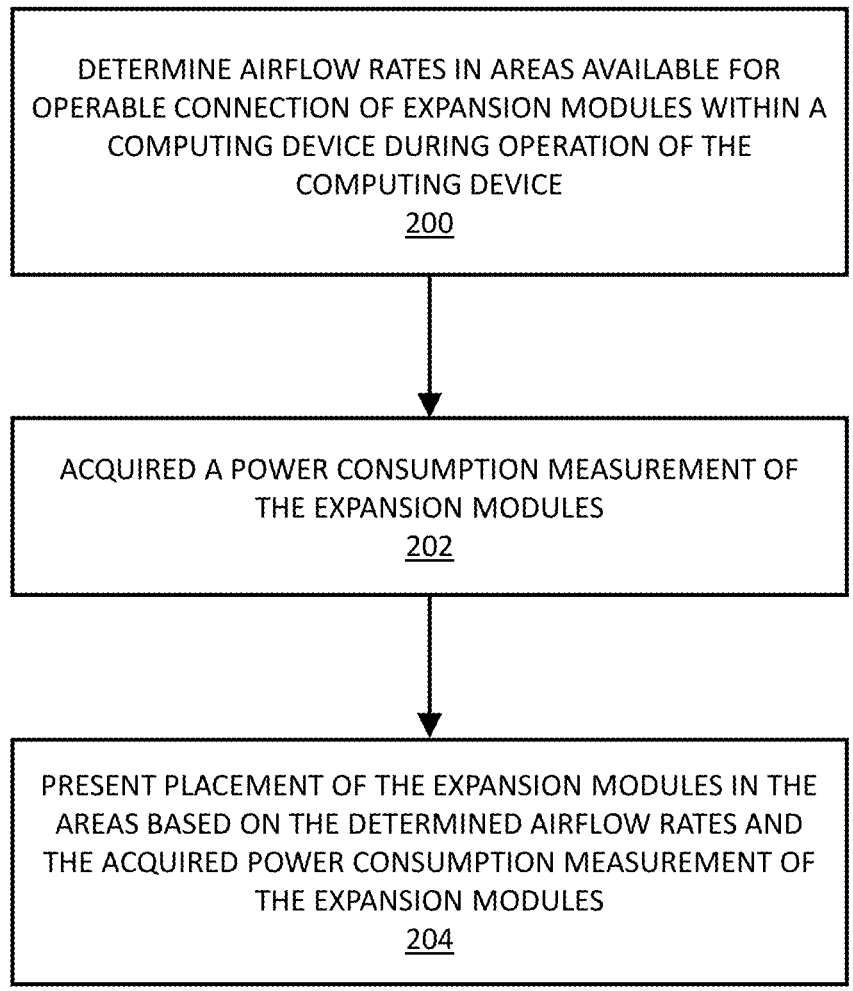
Figure 3:
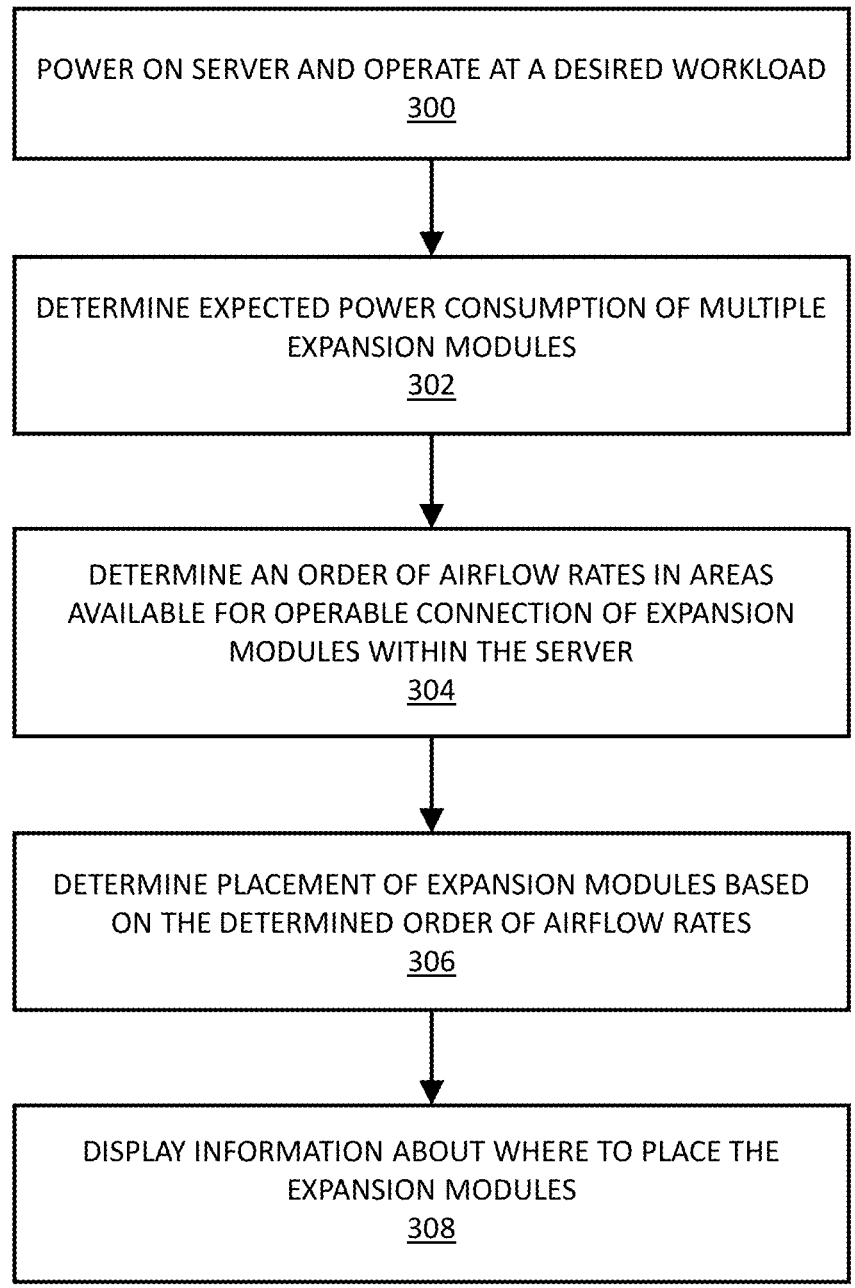
Figure 4:
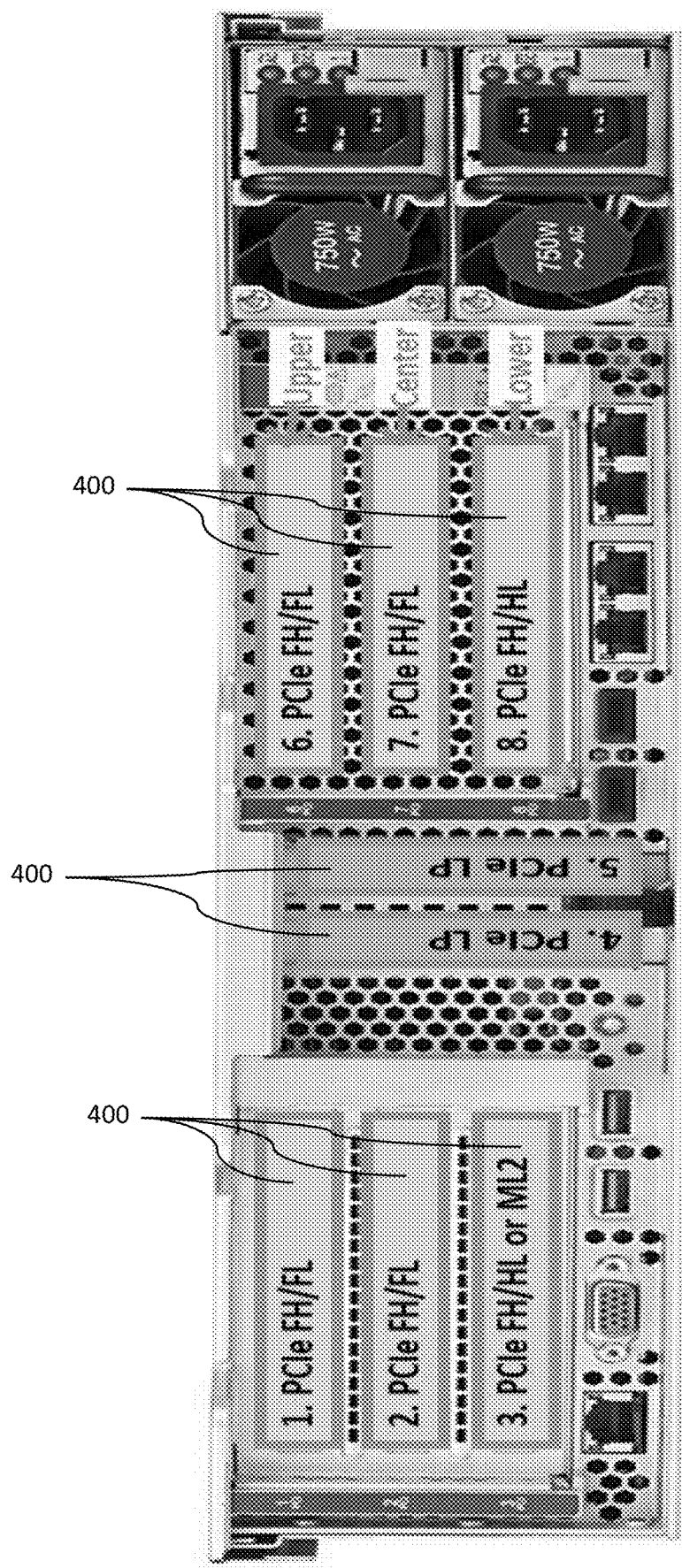

Having thus described the presently disclosed subject matter in general terms, reference will now be made to the accompanying Drawings, which are not necessarily drawn to scale, and wherein:

FIG. 1 is a plan view of an example system 100 for cooling computing device expansion components based on airflow rates in accordance with embodiments of the present disclosure;

FIG. 2 is a flow chart of an example method for cooling computing device expansion components based on airflow rates in accordance with embodiments of the present disclosure;

FIG. 3 is a flow chart of another example method for cooling computing device expansion components based on airflow rates in accordance with embodiments of the present disclosure; and FIG. 4 is a rear view of an external portion of a server including expansion card slots and fans.

SUMMARY

The presently disclosed subject matter provides systems and methods for cooling computing device expansion modules based on airflow rates. According to an aspect, a method includes determining airflow rates in areas available for operable connection of expansion modules within a computing device during operation of the computing device. The method also includes determining expected power consumption of the expansion modules. Further, the method includes presenting placement of the expansion modules in the areas based on the determined airflow rates and the expected power consumption of the expansion modules.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

As referred to herein, the term "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present disclosure. A computing device may be a server or any other type of computing device. For example, a computing device can be any type of conventional computer such as a laptop computer or a tablet computer.

As used herein, the term "memory" is generally a storage device of a computing device. Examples include, but are not limited to, read-only memory (ROM) and random access memory (RAM).

As referred to herein, a user interface is generally a system by which users interact with a computing device. A user interface can include an input for allowing users to manipulate a computing device, and can include an output for allowing the system to present information and/or data, indicate the effects of the user's manipulation, etc. An example of a user interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. The display object can be displayed on a display screen of a computing device and can be selected by and interacted with by a user using the user interface. In an example, the display of the computing device can be a touch screen, which can display the display icon. The user can depress the area of the display screen where the display icon is displayed for selecting the display icon. In another example, the user can use any other suitable user interface of a computing device, such as a keypad, to select the display icon or display object. For example, the user can use a track ball or arrow keys for moving a cursor to highlight and select the display object.

As referred to herein, an expansion module may be any electronic device that can be operably connected to a computing device. For example, the expansion module may also be referred to or known as an expansion card, an expansion board, an adapter card, or an accessory card. The expansion module may include a printed circuit board that can be inserted into an expansion slot of a computing device to add functionality to the computing device via an expansion bus. The computing device may be a server or any other suitable computer. Example expansion modules include, but are not limited to, a PCI-compatible expansion module, an FPGA, a graphics processing unit (GPU), a network interface card, a hard drive, or the like.

FIG. 1 illustrates a plan view of an example system 100 for cooling computing device expansion components based on airflow rates in accordance with embodiments of the present disclosure. All of the areas shown in the example of FIG. 1 are contained within a housing or covering of a server. It should be understood that there may be other areas within the server, but only a limited number are shown in the figure for simplicity of illustration. Also, it should be understood that the areas may be contained within a housing or covering of any suitable computing device, such as a desktop computer or a notebook computer.

Referring to FIG. 1, the system 100 includes multiple areas or spaces 102A-102F available for placement of expansion modules. For example, expansion modules 104A-104C are occupying areas 102A, 102C, and 102D, respectively, and operatively connected into expansion slots 106A, 106C, and 106D at areas 102A, 102C, and 102D, respectively. It is noted that expansion slots 106A, 106C, and 106D are shown by broken lines, because they are occupied by expansion modules 104A-104C. In this example, areas 102B, 102E, and 102F are available for connection of expansion modules to expansion slots 106B, 106E, and 106F.

Air may passively move through the areas 102A-102F, and/or air may be controllably moved through the areas 102A-102F. In this way, the air may pass by any expansion modules occupying the areas 102A-102F to thereby cool the expansion modules. For example, a fan 108 may be suitably positioned and controlled by a baseboard management controller (BMC) 110 to direct air generally in the direction indicated by arrow 112 to flow past and within the areas 102A-102F. The fan 108 may be controlled by the BMC 110 to move the air at a desired airflow rate past expansion modules, such as expansion modules 104A-104C, for cooling the expansion modules. Thereby, the expansion modules may be maintained at a suitable operating temperature. In some embodiments, more than one fan 108 may be used.

In accordance with some embodiments of the present disclosure, the system 100 may include an expansion module manager 114 configured to determine expected airflow rates in areas 102A-102F during operation of the server, to determine expected power consumption of expansion modules, and to communicate a suggested placement of the expansion modules in the areas 102A-102F based on the expected airflow rates and the expected power consumption of the expansion modules. For example, the manager 114 may be provided with and maintain information about the airflow rates in each of areas 102A-102F during operation of the server. Airflow rate information may be stored in memory 116. Further, the manager 114 may determine expected power consumption for each of expansion modules 104A-104C. The manager 114 may determine the expected power consumption based on vital product data (VDP) of an expansion module, a measure of actual power consumption of an expansion module, or any other suitable technique. In an example, a sensor 118 of an expansion module may measure power consumption of the expansion module by measuring its input voltage and the voltage drop across a current sense resistor. Further, for example, a sensor 118 may be used to measure airflow rates. In an example, sensor 118 may be an air velocity meter operable to measure airflow rates. The manager 114 may present placement of the expansion modules in the areas based on the determined airflow rates and the expected power consumption of the expansion modules. For example, the manager 114 may determine an arrangement of expansion modules in areas 102A-102F such that the highest power-consuming expansion modules are placed in the areas with the highest airflow rates, and conversely the lower power-consuming expansion modules are placed in areas with the lowest airflow rates. Further, the manager 114 may use a user interface 120 to display information about arranging the expansion modules in this way.

The manager 114 may be implemented by hardware, software, firmware, of combinations thereof. In this example, the manager 114 is implemented by part of a processing unit 122, which may be a field programmable gate array (FPGA) or any other suitable processing unit.

FIG. 2 illustrates a flow chart of an example method for cooling computing device expansion components based on airflow rates in accordance with embodiments of the present disclosure. The method of FIG. 2 is described by example as being implemented by the system 100 shown in FIG. 1; however, it should be understood that the method may be implemented by any other suitable system.

Referring to FIG. 2, the method includes determining 200 airflow rates in areas available for operable connection of expansion modules within a computing device during operation of the computing device. For example, the manager 114 shown in FIG. 1 may access a database in memory 116 that indicates an expected airflow rate of the areas 102A-102F either individually or in groups. For example, areas 102A, 102C, and 102E may be indicated in the database to have an expected airflow rate of 600 cubic feet per minute (CFM). Areas 102B, 102D, and 102F may be indicated to have an expected airflow rate of 700 CFM. The manager 114 may access and retrieve this information from the memory 116.

The method of FIG. 2 includes acquiring 202 a power consumption measurement of the expansion modules. Continuing the aforementioned example, the manager 114 can acquire one or more power consumption measurements of expansion modules 104A-104C. In this example, the power consumption of expansion module 104C has a higher power consumption than expansion module 104A and 104B. This may be determined, for example, either by measuring power consumption over a period of time, or by reading the power info on the expansion modules VPD.

In accordance with embodiments, power consumption of an expansion module may be acquired by direct power measurement of the expansion module. For example, the power may be measured on a motherboard or other circuit board. In another example, the expansion module may obtain power data directly via I2C. In another example, the data may be determined and stored in an FPGA or other programmable device in a lookup table, and acquired from the lookup table.

The method of FIG. 2 includes presenting 204 a suggested placement of the expansion modules in the areas based on the determined airflow rates and the acquired power consumption measurement of the expansion modules. Continuing the aforementioned example, the manager 114 may determine that expansion module 104C has a higher power consumption than expansion module 104A and 104B. The manager 114 may subsequently determine that the expansion module 104C is to be placed in one of areas 102A, 102D, and 102F, because these areas have a higher airflow rate than areas 102B, 102C, and 102E. Further, the manager 114 may determine that expansion modules 104A and 104B are to be placed in areas 102A, 102C, and 102E.

FIG. 3 illustrates a flow chart of another example method for cooling computing device expansion components based on airflow rates in accordance with embodiments of the present disclosure. The method of FIG. 3 is described by example as being implemented by the system 100 shown in FIG. 1; however, it should be understood that the method may be implemented by any other suitable system.

Referring to FIG. 3, the method includes powering on and operating 300 a server at a desired workload. For example, the system 100 shown in FIG. 1 may be part of a server that is powered on and operating at a desired workload. One or more expansion modules may be connected to expansion slots while the server is operating. Alternatively, no expansion modules may be connected.

The method of FIG. 3 includes determining 302 expected power consumption of multiple expansion modules. These expansion modules may be connected expansion modules and/or expansion modules to be connected to the server. Continuing the aforementioned example, the expected power consumption of expansion modules 104A-104C shown in FIG. 1 may be determined. The expansion module manager 114 can determine expected power consumption of modules based on vital product data of the expansion modules and/or a measure of actual power consumption of the expansion modules. The manager 114 may determine the expected power consumption while the computing device is operating at a predetermined operating condition of the server. The predetermined operating condition may be a normal operating level for the computing device. The manager 114 may receive the measured actual power consumption of the expansion modules during operation of the server while it handles an expected workload. In cost optimized systems, the power consumption may be obtained by reading vital product data (VPD) or reading via I2C the reported power consumption. In another example, power consumption data may be stored in and obtained from an FPGA or other programmable device.

The method of FIG. 3 includes determining 304 an order of airflow rates in areas available for operable connection of expansion modules within the server. Continuing the aforementioned example, the manager 114 may determine that the airflow rate of areas 102E and 102F are the highest among areas 102A-102F. The areas with the next highest airflow rate are areas 102C and 102D. The areas with the next highest airflow rate are areas 102A and 102B.

The method of FIG. 3 includes determining 306 a suggested placement of expansion modules based on the determined order of airflow rates. Continuing the aforementioned example, the manager 114 can determine to suggest placement of expansion modules having the highest power consumption in areas 102E and 102F, the next highest in areas 102C and 102D, and the next highest in areas 102E and 102F. Particularly, expansion modules 104A and 104B may be determined to have the highest power consumption and therefore be suggested by the manager 114 to be connected to expansion slots 106E and 106F. Further, expansion module 104C may be determined to have a lower power consumption and therefore be suggested by the manager 114 to be connected to one of the other expansion slots. The manager 114 may store in memory 116 information indicative of this suggested placement of the expansion modules.

The method of FIG. 3 includes displaying 308 information about where to place the expansion modules. Continuing the aforementioned example, the manager 114 may use a display of the user interface 120 or a display of another computing device to display the information indicative of where to place the expansion modules 104A-104C. Particularly, the display may provide text or a graphical representation to indicate that expansion modules 104A and 104B should be connected to expansion slots 106E and 106F, and that expansion module 104C should be connected to one of the other expansion slots.

FIG. 4 is a rear view of an external portion of a server including expansion cards slots 400 and fans (not shown). The fans may provide cooling to electronic components on the expansion cards 400. Further, in accordance with embodiments of the present disclosure an expansion module manager, such as manager 114 shown in FIG. 1, may determine airflow rates in the areas or spaces at the expansion card slots. Further, the expansion module manager may also determine expected power consumption of the expansion card slots 400. Based on this information, the manager may provide a recommendation to an operator of the placement of the expansion card slots 400 in accordance with embodiments of the present disclosure.

In experiments, tests were performed on the server shown in FIG. 4. The tests were performed on Slots 6-8. A SaS N2226 adapter was installed in each of these slots. Slots 6-8 are horizontal and referred to as Upper, Center, and Lower, respectively. At ambient temperatures of 25 degrees Celsius, the airflow measured at the exit of each slot is approximately 570 cfm for Upper, 605 cfm for Center, and 650 cfm for Lower. From these measurements, the Lower, Center, and Upper slots may be ranked 1, 2, and 3, respectively. The other slots may also be tested and ranked. The ranking may be stored in an FPGA or other programmable IC. The average power for the N2226 adapter is approximately 33 W when fully exercised, but the test data may vary greatly depending on the installed slot location. The following table provides data on power consumption.

|  | Upper Slot (W) | Lower Slot (W) | Power Savings (W) |
|---|---|---|---|
| Card #1 | 38.39 | 28.46 | 9.93 |
| Card #2 | 36.21 | 27.73 | 8.48 |

If the adapter was in the Upper slot, total server power consumption would increase by approximately 10 W. With methods in accordance with the presently disclosed subject matter, the Lower slot may be a preferred slot for this server's configuration and workload. The operator may be advised to move the expansion card to the Lower slot. If the hardware and firmware exists, the system may also compare the power consumption of the option's original install location to the new location to confirm the change lowered power consumption and notify a client of the power savings.

In accordance with embodiments, an alert may be presented to an operator to re-arrange expansion modules. For example, conditions may change and a manager may determine that a different arrangement of expansion modules works better based on determined airflow rates and expected power consumption of the expansion modules as disclosed herein. This information may be presented (e.g., displayed) to an operator so the operator can make a decision about whether to re-arrange the expansion modules.

In accordance with embodiments, a scenario may occur when all or some expansion modules have the same or similar power consumption measurement. In this scenario, the expansion module manager 114 may determine that the expansion modules have the same or similar power consumption measurement. In response to this determination, the expansion module manager 114 may determine that there should not be a suggestion to re-arrange the expansion modules, because the different in power consumption is not sufficient enough to be worthwhile.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Javascript or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A method comprising:
   determining airflow rates in areas available for operable connection of expansion modules within a computing device during operation of the computing device;
   operating the computing device at a predetermined operating condition;
   measuring actual power consumption of the expansion modules in a first arrangement within the areas during operation of the computing device, wherein the actual power consumption is measured at the predetermined operating condition;
   determining a second arrangement of the expansion modules within the areas based on the measured actual power consumption and the determined airflow rates; and
   presenting, on a user interface, indication of placement of the expansion modules in the second arrangement.

2. The method of claim 1, wherein determining airflow rates comprises using a sensor to measure the airflow rates.

3. The method of claim 1, wherein an expansion module comprises one of a peripheral component interconnect (PCI)-compatible expansion module, a field-programmable gate array (FPGA), a graphics processing unit (GPU), a network interface card, and a hard drive.

4. The method of claim 1, wherein the computing device is a server.

5. The method of claim 1, wherein the areas are defined within an interior of the computing device for containing respective expansion modules.

6. The method of claim 1, further comprising determining expected power consumption based on vital product data of the expansion modules, and
   wherein presenting indication of placement comprises presenting indication of placement of the expansion modules in the areas based on the determined expected power consumption.

7. The method of claim 1, wherein presenting indication of placement comprises displaying information about where to place the expansion modules within the areas.

8. The method of claim 1, further comprising storing information indicative of placement of expansion modules.

9. A method comprising:
   determining airflow rates in areas available for operable connection of expansion modules within a computing device during operation of the computing device, wherein the areas available for operable connection includes a first area and a second area, wherein the expansion modules include a first expansion module and a second expansion module, the first expansion module having a higher expected power consumption than the second expansion module, and wherein determining airflow rates comprises determining that the first area has an airflow rate higher than the second area;
   operating the computing device at a predetermined operating condition;
   measuring actual power consumption of the expansion modules, wherein the actual power consumption is measured at the predetermined operating condition; and
   presenting, on a user interface, indication that the first expansion module and the second expansion module are to be placed in the first area and the second area, respectively, based on the determined airflow rates and the measured actual power consumption measurement of the expansion modules.

10. A system comprising:
    a computing device comprising at least one processor configured to execute program instructions to cause the computing device to:
      operate the computing device at a predetermined operating condition;
      measure actual power consumption of expansion modules in a first arrangement within areas of the computing device during operation of the computing device, wherein the areas are available for operable connection of expansion modules within the computing device during the operation of the computing device;
      determine airflow rates in the areas available for operable connection of expansion modules within the computing device during operation of the computing device;
      determine a second arrangement of the expansion modules within the areas based on the measured actual power consumption and the determined airflow rates and
      present, on a user interface, indication of placement of the expansion modules in the second arrangement.

11. The system of claim 10, further comprising a sensor configured to measure the airflow rates.

12. The system of claim 10, wherein the areas available for operable connection includes a first area and a second area,
wherein the expansion modules include a first expansion module and a second expansion module, the first expansion module having a higher expected power consumption than the second expansion module,
wherein the at least one processor is configured to execute program instructions to cause the computing device to determine that the first area has an airflow rate higher than the second area, and
wherein the user interface indicates that the first expansion module and the second expansion module are to be placed in the first area and the second area, respectively.

13. The system of claim 10, wherein an expansion module comprises one of a peripheral component interconnect (PCI)-compatible expansion module, a field-programmable gate array (FPGA), a graphics processing unit (GPU), a network interface card, and a hard drive.

14. The system of claim 10, wherein the at least one processor is configured to execute program instructions to cause the computing device to determine expected power consumption based on one of vital product data of the expansion modules or a measure of actual power consumption of the expansion modules.

15. The system of claim 10, wherein the user interface displays information about where to place the expansion modules within the areas.

16. The system of claim 10, wherein the at least one processor is configured to execute program instructions to cause the computing device to store information indicative of placement of expansion modules.

* * * * *